US009491287B2

United States Patent
Zheng et al.

(10) Patent No.: US 9,491,287 B2
(45) Date of Patent: Nov. 8, 2016

(54) RINGTONE ASSIGNMENT SYSTEM AND THE METHOD THEREOF

(71) Applicant: Chunghwa Telecom Co., Ltd., Yangmei, Taoyuan County (TW)

(72) Inventors: Fu-Rong Zheng, Yangmei (TW); Chi-Hung Lien, Yangmei (TW); Yi-Hsiu Lin, Yangmei (TW); Shih-Yu Chang, Yangmei (TW); Kuan-Feng Wu, Yangmei (TW)

(73) Assignee: CHUNGHWA TELECOM CO., LTD., Yangmei, Taoyuan County (TW)

( * ) Notice: Subject to any disclaimer, the term of this patent is extended or adjusted under 35 U.S.C. 154(b) by 0 days.

(21) Appl. No.: 14/504,111

(22) Filed: Oct. 1, 2014

(65) Prior Publication Data

US 2015/0181030 A1 Jun. 25, 2015

(30) Foreign Application Priority Data

Dec. 20, 2013 (TW) .............................. 102147368 A

(51) Int. Cl.
*H04M 3/42* (2006.01)
*H04M 19/04* (2006.01)
*H04W 4/18* (2009.01)
*H04M 3/02* (2006.01)

(52) U.S. Cl.
CPC ........... *H04M 3/42051* (2013.01); *H04M 3/02* (2013.01); *H04M 19/04* (2013.01); *H04W 4/18* (2013.01); *H04M 2201/50* (2013.01)

(58) Field of Classification Search
CPC .. H04M 1/57; H04M 1/575; H04M 1/72519; H04M 2207/18; H04M 3/42042; H04M 3/42051; H04M 19/04; H04M 3/02; H04M 2201/50; H04W 4/18

USPC ............................................... 455/412.1–415
See application file for complete search history.

(56) References Cited

U.S. PATENT DOCUMENTS

| | | | | |
|---|---|---|---|---|
| 9,008,703 | B1* | 4/2015 | Major ............... | H04M 3/53333 379/1.03 |
| 2004/0137929 | A1* | 7/2004 | Jones ................. | H04N 21/6582 455/517 |
| 2005/0176423 | A1* | 8/2005 | Park .................. | H04L 29/12103 455/428 |
| 2006/0183097 | A1* | 8/2006 | Ishii ....................... | G06Q 20/12 434/307 R |
| 2007/0081660 | A1* | 4/2007 | Luft ...................... | H04M 1/576 379/355.01 |

(Continued)

*Primary Examiner* — Sharad Rampuria
(74) *Attorney, Agent, or Firm* — Muncy, Geissler, Olds & Lowe, P.C.

(57) ABSTRACT

A ringtone assignment system and method are provided. The method includes steps of recording a multimedia ringtone via a first communication device, transmitting a communication linking request to a communication exchange host, transmitting the communication linking request to a second communication device via the communication exchange host to enable the second communication device to feed back ringtone format information supported by the second communication device according to the communication linking request, transmitting the ringtone format information to the first communication device via the communication exchange host to enable the first communication device to code the multimedia ringtone according to the ringtone format information, transmitting the multimedia ringtone from the first communication device to the second communication device, and then decoding and playing the multimedia ringtone by the second communication device. The second communication device is able to recode and assign the multimedia ringtone to the first communication device.

10 Claims, 2 Drawing Sheets

(56) References Cited

U.S. PATENT DOCUMENTS

| | | | |
|---|---|---|---|
| 2007/0153766 A1* | 7/2007 | Bienn | H04M 3/42 370/352 |
| 2009/0157816 A1* | 6/2009 | Pattan | H04L 12/581 709/206 |
| 2009/0296904 A1* | 12/2009 | Brewer | H04M 3/42042 379/93.23 |
| 2010/0056128 A1* | 3/2010 | Hwang | G10L 21/06 455/418 |
| 2010/0203871 A1* | 8/2010 | Ozawa | H04M 3/02 455/414.1 |
| 2012/0045048 A1* | 2/2012 | Karani | H04M 3/465 379/207.16 |
| 2012/0071142 A1* | 3/2012 | Medved | H04M 19/04 455/414.1 |
| 2015/0005041 A1* | 1/2015 | Lim | H04M 19/04 455/567 |
| 2016/0134750 A1* | 5/2016 | Shen | H04M 1/656 455/415 |

\* cited by examiner

RINGTONE ASSIGNMENT SYSTEM AND THE METHOD THEREOF

BACKGROUND OF THE INVENTION

1. Field of the Invention

The present invention is related to a smart communication technology. In particular, the present invention is related to a ringtone assignment system and method thereof, so that the speaker is able to assign ringtones to a ringtone assignment system of the receiver.

2. Description of the Prior Art

The conventional ringtone method and system generally comprise: (1) playing a ringtone stored by the receiver, (2) playing a ringtone stored on internet, (3) playing a ringtone stored by the receiver on the internet according to a configuration stored on internet, and (4) playing a ringtone stored on the internet according to a configuration stored on internet.

However, the conventional ringtone technologies are limited for at least the following reasons:

1. The speaker can only select a ringtone from existing ringtones.
2. The speaker and receiver have to complete multiple and complicated communications and operations for ringtone transmission, and the speaker and receiver have to upload/download a ringtone or ringtone related message to assign a ringtone.
3. The ringtone transmission and playing relies on a remote host.

SUMMARY OF THE INVENTION

In light of conventional technologies, one objective of the present invention is to provide a ringtone assignment system and method thereof, which makes the speaker able to directly assign a multimedia file from the speaker as the ringtone to the receiver. The receiver's ringtone is not limited to the existing content of the equipment and is free from relying on a remote host for transmitting or playing a ringtone.

According to the objectives of the present invention, a ringtone assignment system is provided, which comprises a communication exchange host configured to build a communication link among a plurality of communication devices for signal transmission and data exchange, and a first communication device configured to record a multimedia ringtone and transmit a communication linking request to the communication exchange host. When the first communication device receives a ringtone format data from the communication exchange host, the first communication device codes the multimedia ringtone according to the ringtone format and then transmits the multimedia ringtone to a second communication device. The second communication device is configured to receive the communication linking request transmitted via the communication exchange host from the first communication device, and to reply with the ringtone format information supported by the second communication device to the communication exchange host according to the communication linking request. The first communication device is configured to receive the coded multimedia ringtone. The second communication device is configured to record and assign the multimedia ringtone to the first communication device.

Preferably, the first communication device and the second communication device are connected to the communication exchange host via an internet connection.

Preferably, both the first communication device and the second communication device are set with a user end module. The user end module comprises a ringtone transceiver logic control unit configured to transceive the multimedia ringtone, a signal control unit configured to control transmission of the communication linking request, the ringtone format information, and the multimedia ringtone, and a multimedia signal process unit configured to proceed with the coding and decoding of the multimedia ringtone.

Preferably, the user end module further comprises a multimedia data arrangement unit configured to record historical information of the transceived multimedia ringtone.

Preferably, the user end module further comprises a multimedia data storage unit configured to store the multimedia ringtone.

According to the objectives of the present invention, a method of ringtone assignment is provided, which comprises the steps of recording a multimedia ringtone via a first communication device and then transmitting a communication linking request to a communication exchange host, transmitting the communication linking request to a second communication device via the communication exchange host to enable the second communication device to feed back a ringtone format information supported by the second communication device according to the communication linking request, transmitting the ringtone format information to the first communication device via the communication exchange host to enable the first communication device to code the multimedia ringtone according to the ringtone format information, transmitting the multimedia ringtone from the first communication device to the second communication device, and then decoding and playing the multimedia ringtone by the second communication device. The second communication device is able to recode and assign the multimedia ringtone to the first communication device.

As discussed above, the ringtone assignment system and method thereof of the present invention have one or more advantages, for example:

1. The present invention enables the receiver to hear a ringtone assigned by the speaker before answering a call, and the ringtone can be in an audio or video format.
2. The present invention enables the speaker to assign a recorded multimedia ringtone as a particular ringtone of a call.
3. The present invention enables the receiver to instantly play the ringtone transmitted by the speaker.
4. The present invention enables the receiver to automatically store the ringtone assigned by the speaker.
5. The present invention enables the receiver to sequentially receive ringtones.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
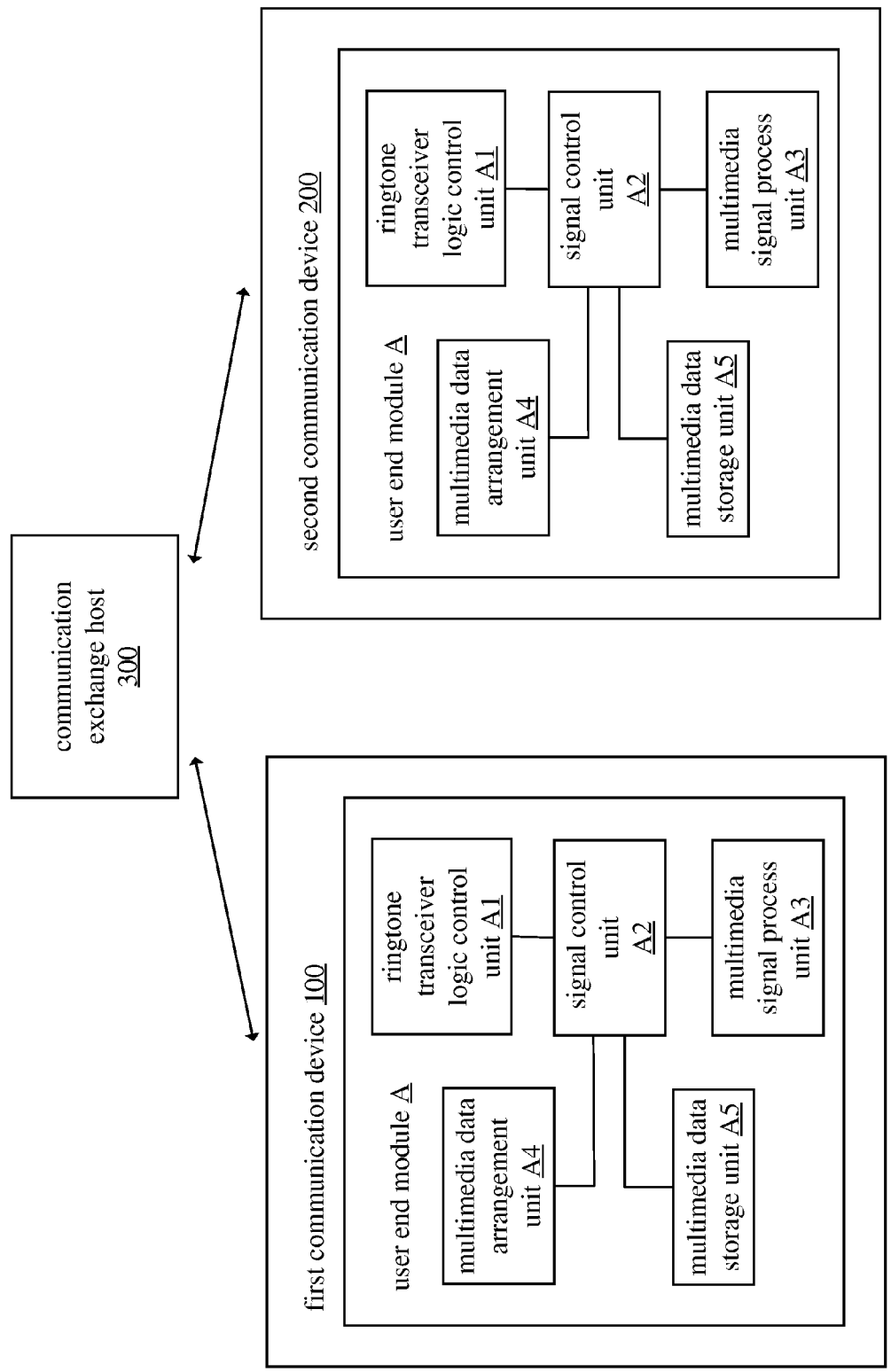
FIG. 1 shows a diagram of the ringtone assignment system of the present invention.

The following reference numerals are utilized in the present application:
- 100—first communication device
- 200—second communication device
- 300—communication exchange host
- A—user end module
- A1—ringtone transceiver logic control unit
- A2—signal control unit
- A3—multimedia signal process unit
- A4—multimedia data arrangement unit
- A5—multimedia data storage unit

DETAILED DESCRIPTION OF THE PREFERRED EMBODIMENTS

The present invention will become more fully understood from the detailed description given hereinbelow and the accompanying drawings which are given by way of illustration only, and thus are not limitative of the present invention, and wherein:

The ringtone assignment system and method thereof of the present invention are configured to be applied in all software-type phone systems for the speaker to assign customized or existing multimedia ringtones to the receiver for playing, recording, or playing after answering a call.

FIG. 1 shows a diagram of the ringtone assignment system of the present invention. The ringtone assignment system comprises a first communication device 100, a second communication device 200, and a communication exchange host 300. The communication exchange host 300 is able to build up internet communication for communication linking among a plurality of communication devices for signal transmission and data exchange. The communication exchange host 300 at least supports rfc3261 and the compatible communication protocols. The number of hosts can be one or more than one, and internet devices and systems for proxy operation can be added. The first communication device 100 and the second communication device 200 are capable of internet connection for being connected to the communication exchange host 300 via an internet connection. The first communication device 100 and the second communication device 200 can be a smart phone, smart plate, computer, etc, which are compatible WITH rfc3261, rfc3550, and rfc6222 and compatible communication protocols, but is not limited thereto. When the first communication device 100 behaves as a speaker, it is able to record a multimedia ringtone and transmit a communication linking request to the communication exchange host 300. When the first communication device 100 receives ringtone format information from the communication exchange host 300, the first communication device 100 is configured to code the multimedia ringtone according to the ringtone format information, and then transmit the multimedia ringtone to the second communication device 200. When the second communication device 200 behaves as a receiver, it is able to receive the communication linking request transmitted via the communication exchange host 300 from the first communication device 100, and reply with the ringtone format information supported by the second communication device 200 to the communication exchange host 300 according to the communication linking request, and then receive the multimedia ringtone coded by the first communication device 100. The second communication device 200 can also behave as a speaker and can be configured to record and assign the multimedia ringtone to the first communication device 100.

The first communication device 100 and the second communication device 200 are both set with a user end module A. The user end module A comprises a ringtone transceiver logic control unit A1 configured to transceive the multimedia ringtone, a signal control unit A2 configured to control transmission of the communication linking request, the ringtone format information, and the multimedia ringtone, a multimedia signal process unit A3 configured to proceed with the coding and decoding of the multimedia ringtone, a multimedia data arrangement unit A4 configured to record historical information of the transceived multimedia ringtone, and a multimedia data storage unit configured to store the multimedia ringtone according to a user configuration.

The following embodiments are provided to explain operation of the present invention.

In first embodiment, the first communication device 100 behaves as a speaker, and the second communication device 200 behaves as a receiver. The number of the first communication device 100 and the second communication device 100 is one. Both of the devices are software-type internet phones, and the communication exchange host 300 is compatible with rfc3261 communication protocol. The first communication device 100, the second communication device 200, and the communication exchange host 300 proceed with communication under an IP multimedia subsystem, IMS. First, the first communication device 100 calls the ringtone transceiver logic control unit A1 to activate a ringtone transmission function and record a multimedia ringtone via the multimedia signal process unit A3, then assign the second communication device 200 as the receiver, and then make a call thereto. The signal control unit A2 is then configured to transmit the communication linking request to the communication exchange host 300. The communication exchange host 300, after receiving the request from the first communication device 100, is configured to transmit the communication linking request to the second communication device 200. The second communication device 200 then activates the ringtone transceiver logic control unit A1 and replies with the ringtone format information supported by the second communication device 200 to the communication exchange host 300 via the signal control unit A2 for transmitting the ringtone format information to the first communication device 100 via the communication exchange host 300. When the first communication device 100 receives the call response from the communication exchange host 300, the multimedia signal process unit A3 codes the multimedia ringtone according to the ringtone format information assigned by the second communication device 200, and then the multimedia ringtone is transmitted to the second communication device 200. The second communication device 200 then decodes the multimedia ringtone by the multimedia signal process unit A3 and plays the multimedia ringtone. The multimedia data arrangement unit A4 records the historical characters of the multimedia ringtone and the multimedia data storage unit A5 can automatically store the multimedia ringtone.

In a second embodiment, the first communication device 100 behaves as a speaker, the number of the first communication device 100 is one, the second communication device 200 behaves as a receiver, and the number of the second communication device 200 is more than one. The first communication device 100 and the second communication devices 200 are software-type internet phones, and the communication exchange host 300 is compatible with rfc3261 communication protocol. The first communication device 100, the second communication devices 200, and the communication exchange host 300 proceed with communication under an IP multimedia subsystem, IMS. First, the first communication device 100 calls the ringtone transceiver logic control unit A1 to activate a ringtone transmission function and record a multimedia ringtone via the multimedia signal process unit A3, then assign the plurality of second communication devices 200 as the receiver, and then make a plurality of calls respectively. The signal control unit A2 is then configured to transmit the plurality of communication linking requests to the communication exchange host 300. The communication exchange host 300, after receiving these requests from the first communication device 100, is configured to transmit these communication linking requests to the plurality of second communication devices 200. Then, each of the plurality of second communication devices 200 activates the ringtone transceiver logic control unit A1 and replies with the ringtone format information supported by the second communication devices 200 to the communication exchange host 300 via the signal control unit A2 for transmitting the ringtone format information to the first communication device 100 via the communication exchange host 300. When the first communication device 100 receives the call responses from the communication exchange host 300, the multimedia signal process unit A3 codes a plurality of different multimedia ringtones respectively according to the different ringtone format information assigned by each of the second communication devices 200. The multimedia ringtones are then transmitted to each of the second communication devices 200, respectively. Each of the second communication devices 200 then decodes the multimedia ringtone by the multimedia signal process unit A3 and plays the multimedia ringtone. The multimedia data arrangement unit A4 records the historical characters of the multimedia ringtone and the multimedia data storage unit A5 can automatically store the multimedia ringtone.

In a third embodiment, the first communication device 100 behaves as a speaker, the number of the first communication device 100 is more than one, the second communication device 200 behaves as a receiver, and the number of the second communication device 200 is one. The first communication devices 100 and the second communication device 200 are software-type internet phones, and the communication exchange host 300 is compatible with rfc3261 communication protocol. The first communication devices 100, the second communication device 200, and the communication exchange host 300 proceed with communication under an IP multimedia subsystem, IMS. First, each of the first communication devices 100 calls the ringtone transceiver logic control unit A1 to activate a ringtone transmission function and record a multimedia ringtone via the multimedia signal process unit A3, then assign the second communication device 200 as the receiver, and then make a call thereto. The signal control unit A2 is then configured to transmit the communication linking request to the communication exchange host 300. The communication exchange host 300, after receiving the requests from each of the first communication devices 100, is configured to transmit the communication linking requests to the second communication device 200. Then, the second communication device 200 activates the ringtone transceiver logic control unit A1 and replies with the ringtone format information supported by the second communication device 200 to the communication exchange host 300 via the signal control unit A2 for transmitting ringtone format information to each of the first communication devices 100 via the communication exchange host 300. When each of the first communication devices 100 receives each of the call responses respectively from the communication exchange host 300, the multimedia signal process unit A3 codes the multimedia ringtone according to the ringtone format information assigned by the second communication device 200. The multimedia ringtone is then transmitted to the second communication device 200. The second communication device 200 then decodes the multimedia ringtone by the multimedia signal process unit A3 and plays each of the multimedia ringtones. The multimedia data arrangement unit A4 records the historical characters of the multimedia ringtones and the multimedia data storage unit A5 can automatically store the multimedia ringtones.

Figure 2:
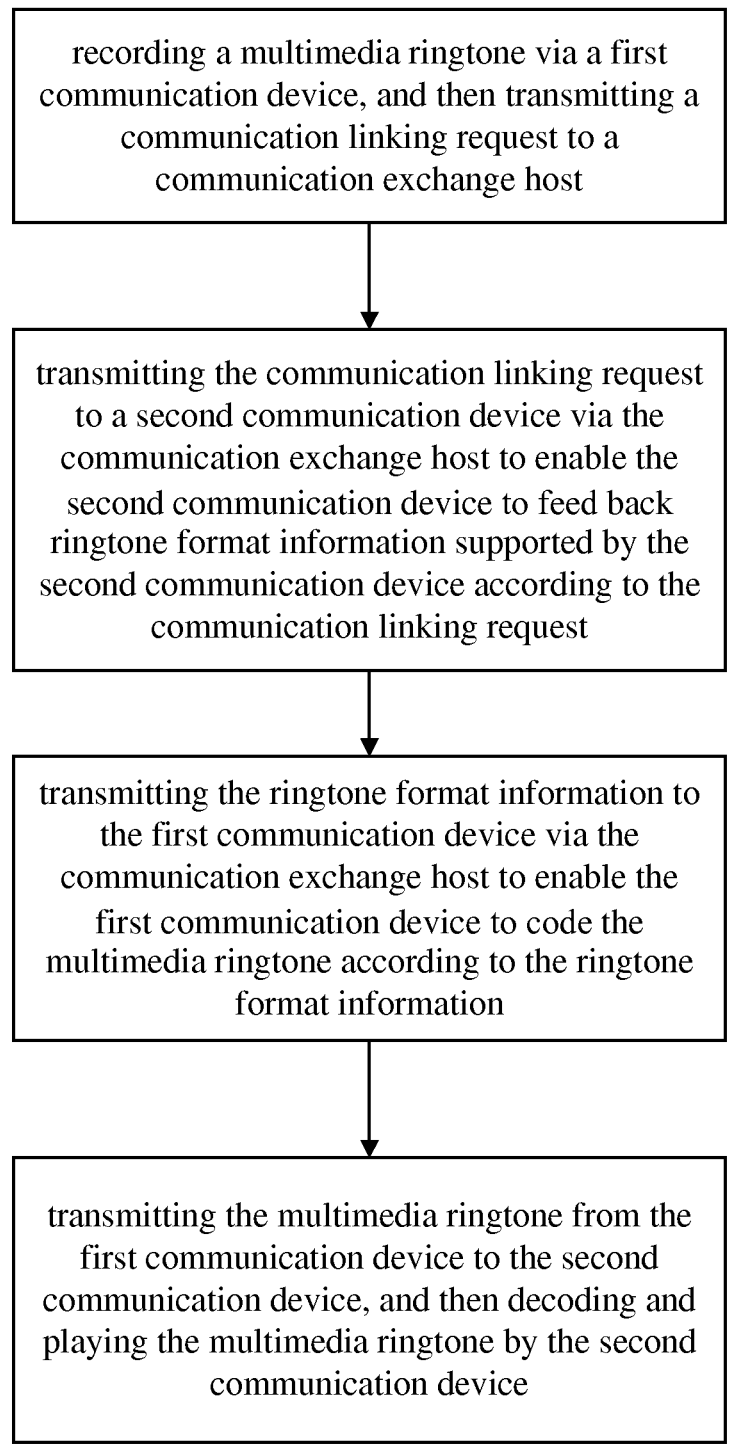
FIG. 2 shows a flow diagram of the method of ringtone assignment of the present invention.

FIG. 2 shows the flow diagram of method of ringtone assignment of the present invention, which comprises the following steps:

Step S11: recording a multimedia ringtone via a first communication device, and then transmitting a communication linking request to a communication exchange host;

Step S12: transmitting the communication linking request to a second communication device via the communication exchange host to enable the second communication device to feed back a ringtone format information supported by the second communication device according to the communication linking request;

Step S13: transmitting the ringtone format information to the first communication device via the communication exchange host to enable the first communication device to code the multimedia ringtone according to the ringtone format information;

Step S14: transmitting the multimedia ringtone from the first communication device to the second communication device, and then decoding and playing the multimedia ringtone by the second communication device.

In aforementioned steps, the second communication device is able to recode and assign the multimedia ringtone to the first communication device.

In the foregoing description, the ringtone assignment system and method thereof are able to provide a ringtone to the receiver assigned by the speaker, which comprises features of: (1) the speaker and receiver are able to establish a connection via internet control signal and then exchange hardware information, (2) the speaker is able to assign a ringtone to the receiver, (3) the receiver is able to play and meanwhile record the ringtone, and (4) the receiver is able to record the playing sequence. Thus, the receiver's ringtone is not limited to the existing contents of the equipment and is free from relying on a remote host for transmitting or playing a ringtone.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A ringtone assignment system, comprising:
 a communication exchange host, being configured to build a communication link among a plurality of communication devices for signal transmission and data exchange;
 a first communication device, being configured to record a multimedia ringtone and transmit a communication linking request to the communication exchange host, wherein when the first communication device receives a ringtone format data from the communication exchange host, the first communication device codes the multimedia ringtone according to the ringtone format; and a second communication device, being configured to receive the communication linking request transmitted via the communication exchange host from the first communication device, and reply with the ringtone format information supported by the second communication device to the communication exchange host according to the communication linking request, and then receive the multimedia ringtone coded by the first communication device;

wherein the second communication device is configured to record and assign the multimedia ringtone to the first communication device, and wherein said ringtone format is formatted with a rfc3261 communication protocol.

2. The ringtone assignment system as claimed in claim 1, wherein the first communication device and the second communication device are connected to the communication exchange host via an internet connection.

3. The ringtone assignment system as claimed in claim 1, wherein the first communication device and the second communication device are both set with a user end module, the user end module comprising:

a ringtone transceiver logic control unit being configured to transceive the multimedia ringtone;

a signal control unit being configured to control transmission of the communication linking request, the ringtone format information, and the multimedia ringtone; and a multimedia signal process unit being configured to proceed the coding and decoding of the multimedia ringtone.

4. The ringtone assignment system as claimed in claim 3, wherein the user end module further comprises a multimedia data arrangement unit being configured to record historical information of the transceived multimedia ringtone.

5. The ringtone assignment system as claimed in claim 4, wherein the user end module further comprises a multimedia data storage unit being configured to store the multimedia ringtone.

6. A method of ringtone assignment, comprising the steps of:

recording a multimedia ringtone via a first communication device, and then transmitting a communication linking request to a communication exchange host;

transmitting the communication linking request to a second communication device via the communication exchange host to enable the second communication device to feed back ringtone format information supported by the second communication device according to the communication linking request;

transmitting the ringtone format information to the first communication device via the communication exchange host to enable the first communication device to code the multimedia ringtone according to the ringtone format information; and transmitting the multimedia ringtone from the first communication device to the second communication device, and then decoding and playing the multimedia ringtone by the second communication device;

wherein the second communication device is able to recode and assign the multimedia ringtone to the first communication device, and wherein said ringtone format is formatted with a rfc3261 communication protocol.

7. The method of ringtone assignment as claimed in claim 6, wherein the first communication device and the second communication device are connected to the communication exchange host via an internet connection.

8. The method of ringtone assignment as claimed in claim 6, wherein the first communication device and the second communication device are both set with a user end module, the method comprising steps of:

transceiving the multimedia ringtone via a ringtone transceiver logic control unit of the user end module;

controlling transmission of the communication linking request, the ringtone format information, and the multimedia ringtone via a signal control unit of the user end module; and coding and decoding the multimedia ringtone via a multimedia signal process unit of the user end module.

9. The method of ringtone assignment as claimed in claim 8, wherein the first communication device and the second communication device are configured to record historical information of the transceived multimedia ringtone via a multimedia data arrangement unit of the user end module.

10. The method of ringtone assignment as claimed in claim 9, wherein the first communication device and the second communication device are configured to store the multimedia ringtone via a multimedia data storage unit of the user end module.

* * * * *